United States Patent [19]

Ikeda et al.

[11] Patent Number: 5,396,066
[45] Date of Patent: Mar. 7, 1995

[54] DISPLACEMENT ELEMENT, CANTILEVER PROBE AND INFORMATION PROCESSING APPARATUS USING CANTILEVER PROBE

[75] Inventors: Tsutomu Ikeda, Hachiohji; Keisuke Yamamoto, Yamato; Masaru Nakayama, Atsugi; Takayuki Yagi, Machida; Haruki Kawada, Yokohama, all of Japan

[73] Assignee: Canon Kabushiki Kaisha, Tokyo, Japan

[21] Appl. No.: 253,609

[22] Filed: Jun. 3, 1994

Related U.S. Application Data

[63] Continuation of Ser. No. 74,464, Jun. 10, 1993, abandoned.

[30] Foreign Application Priority Data

Jul. 6, 1992 [JP] Japan .................... 4-200201
Apr. 20, 1993 [JP] Japan .................... 5-115248

[51] Int. Cl.⁶ ............................................. H01J 37/28
[52] U.S. Cl. ....................................... 250/306; 369/126; 310/309
[58] Field of Search ......................... 250/306; 369/126; 310/309

[56] References Cited

U.S. PATENT DOCUMENTS

| 4,668,865 | 5/1987 | Gimzewski et al. | 250/306 |
|---|---|---|---|
| 4,672,265 | 6/1987 | Eguchi et al. | 313/504 |
| 4,798,740 | 1/1989 | Tomida et al. | 427/43.1 |
| 4,939,556 | 7/1993 | Eguchi et al. | 357/4 |
| 5,026,415 | 6/1991 | Yamamoto et al. | 65/305 |
| 5,032,159 | 7/1991 | Kuwabara et al. | 65/64 |
| 5,051,643 | 9/1991 | Dworsky | 310/309 |
| 5,136,212 | 8/1992 | Eguchi et al. | 315/150 |
| 5,140,398 | 8/1992 | Matsuda et al. | 357/30 |
| 5,196,283 | 3/1993 | Ikeda et al. | 430/5 |
| 5,202,156 | 4/1993 | Yamamoto et al. | 427/135 |

FOREIGN PATENT DOCUMENTS

| 0194323 | 9/1986 | European Pat. Off. | G01N 27/00 |
|---|---|---|---|
| 0363550 | 4/1990 | European Pat. Off. | G11B 9/00 |
| 0491973 | 7/1992 | European Pat. Off. | G01N 27/00 |
| 0518618 | 12/1992 | European Pat. Off. | G01N 27/00 |
| 63-161552 | 7/1988 | Japan | G11B 9/00 |
| 63-161553 | 7/1988 | Japan | G11B 9/00 |

OTHER PUBLICATIONS

Patent Abstracts of Japan, vol. 016, No. 189 (P-1348), May 8, 1992 & JP-A-40 025 764 (NEC Corp), Jan. 21, 1992.
IBM Technical Disclosure Bulletin, vol. 32, No. 12, May 1990, pp. 49-51, "Self-controlled Micromechanical Scanning Tunneling Microscopy Sensor".
Review of Scientific Instruments, vol. 61, No. 9, Sep. 1990, pp. 2296-2308, G. Neubauer et al., "Force Microscopy With a Bidirectional Capacitance Sensor".
Sensors and Actuators A, vol. A23, No. 1/3, Apr. 1990, pp. 964-979, S. Akamine et al., "A Planar Process For Microfabrication of a Scanning Tunnelling Microscope".
Micro Electro Mechanical Systems, Feb. 11-14, 1990, C. F. Quate, Ginzton Laboratory, "Imaging With The Tunneling & Force Microscopes".
Vacuum Science & Technology A, vol. 8, No. 1, Jan.-/Feb. 1990, E. E. Ehrichs et al., "Etching Of Silicon (III) With The Scanning Tunneling Microscope".

*Primary Examiner*—Jack I. Berman
*Attorney, Agent, or Firm*—Fitzpatrick, Cella, Harper & Scinto

[57] ABSTRACT

A displacement element including a substrate having electrodes and a cantilever provided on the substrate, wherein the cantilever is formed from a semiconductor material and has at least two electrostatic driving electrodes formed by diffusing an impurity into a semiconductor material.

18 Claims, 7 Drawing Sheets

DISPLACEMENT ELEMENT, CANTILEVER PROBE AND INFORMATION PROCESSING APPARATUS USING CANTILEVER PROBE

This application is a continuation of application Ser. No. 08/074,464, filed Jun. 10, 1993, now abandoned.

BACKGROUND OF THE INVENTION

1. Field of the Invention

The present invention relates to a displacement element suitable for use in a tunnel current detecting device, a scanning tunneling microscope or the like, and to a cantilever probe employing this element. The present invention particularly relates to a large-capacity and high-density information processing apparatus for recording, reproducing and erasing information by using the cantilever probe through the technology of a scanning tunneling microscope.

2. Description Of the Related Art

In recent years, electromechanical elements (micromechanics), such as semiconductor pressure sensors, semiconductor acceleration sensors, microactuators or the like using semiconductors as mechanical structures have attracted attention as applied to a background of semiconductor process technology.

Such elements are desirable because they are compact and high-precision mechanical parts are readily available. Since a semiconductor wafer is used, elements and electrical circuits can be formed integrally on a Si wafer. An increase in productivity through batch operations of a semiconductor process can be expected by manufacturing such elements based on such semiconductor processes. An example of a very small displacement element is a cantilevered one using an electrostatic force or a piezoelectric thin film. Since very small movements of this element can be finely controlled, this element is applied to a scanning tunneling microscope (hereinafter referred to as a STM) capable of directly observing atomic and molecular levels.

Figure 6A:
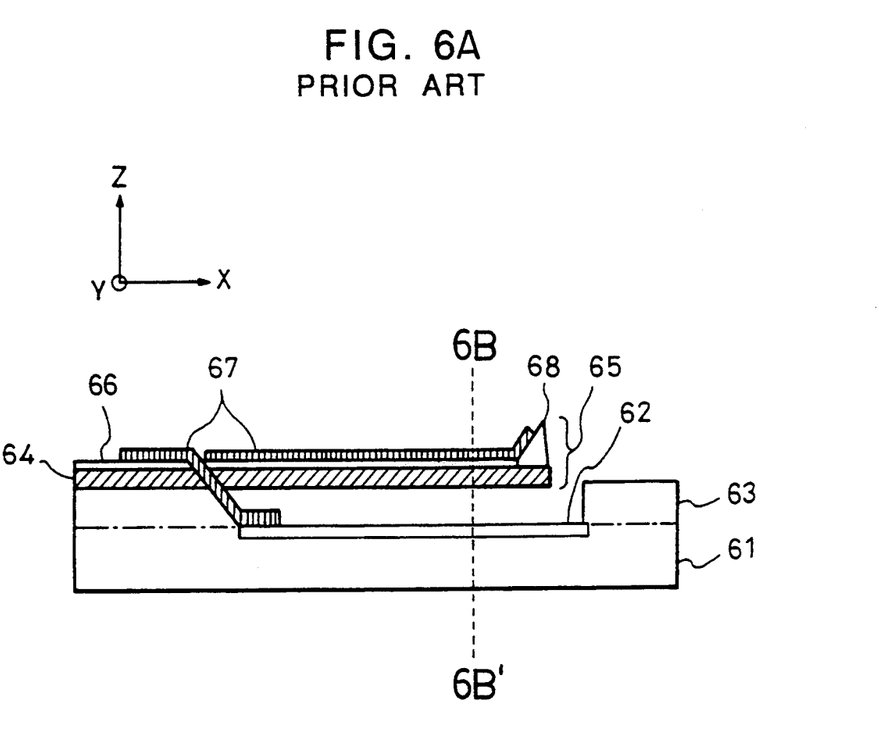
FIGS. 6A and 6B are an illustration of a conventional cantilever probe.
Figure 6B:
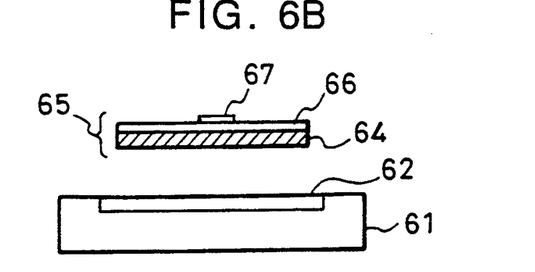
Figure 7:
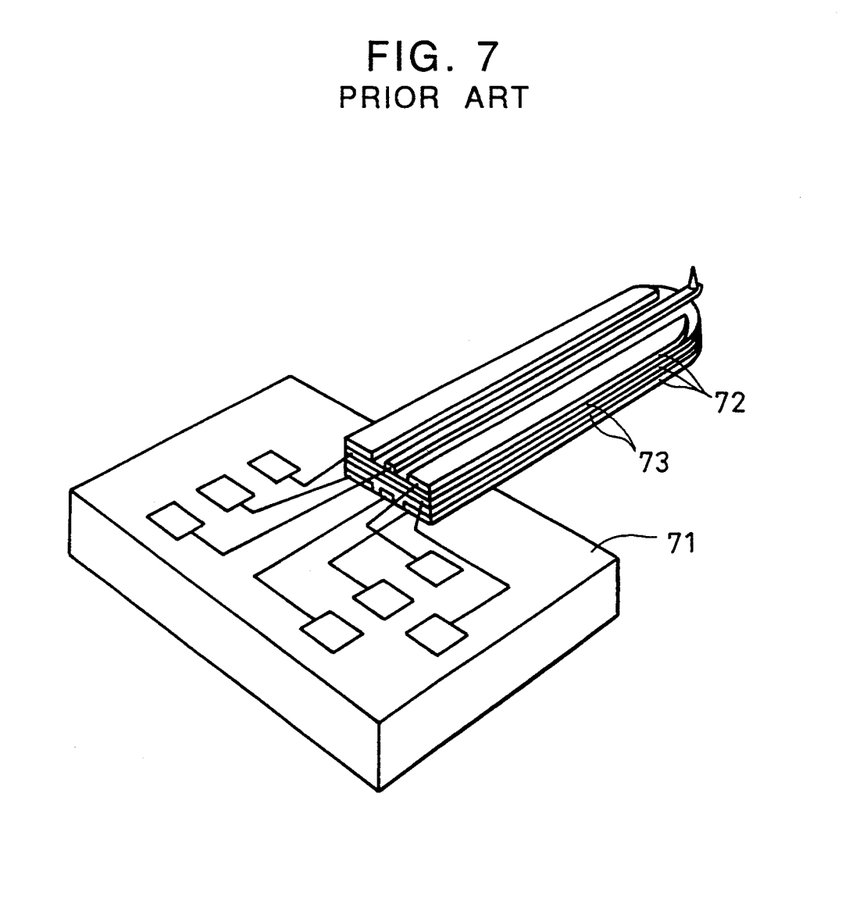
FIG. 7 is an illustration of the conventional cantilever probe.

A cantilever using an electrostatic force has been proposed in, for example, U.S. Pat. No. 4,668,865. As shown in FIGS. 6A and 6B, this is formed into a cantilever 65 by epitaxially growing Si 63 after an electrode layer 62 is provided on a Si wafer 61 by doping an impurity, again doping an impurity into it to form an electrode 64, then removing a non-doped Si layer in between, forming a lead electrode 67 by vapor deposition. A piezoelectric thin film is used in structures such as an STM probe (IEEE Micro Electro Mechanical Systems, P188–199, February 1990) proposed by Quate et. al. of Stanford University. As shown in FIG. 7, this is formed by removing a part of the rear surface of the Si wafer to form a silicon membrane, stacking Al 72 and ZnO 73 sequentially on the surface of a bimorph cantilever, then removing the silicon membrane and an etching protecting layer (a silicon nitride film) on the surface of the wafer by reactive dry etching, thus forming a bimorph cantilever for STM tip displacement. A microtip for detecting the tunnel current is mounted on the free end portion of the top surface of the cantilever so that a satisfactory STM image can be obtained.

The observations of semiconductors, polymers or the like at atomic and molecular levels have been evaluated by use of a STM technique, and micromachining (E. E. Ehrichs, 4th International Conference on Scanning Tunneling Microscope/Spectroscopy, '89, S13-3) has been researched. Applications of recording and reproducing apparatuses in various fields has also been researched. In particular, there is an increasing demand for large capacity recording apparatuses for storing information upon which calculation is performed by a computer. Since microprocessors have become compact and its calculation performance capability increased with advances in the semiconductor process technology, there is a demand for recording apparatuses to be more compact. In order to satisfy these needs, a recording apparatus has been proposed which records and writes by varying the shape of a recording medium by applying a voltage from a converter formed of a microprobe. Such a microtip is provided on a driving means capable of finely adjusting the distance to a recording medium, for generating a tunnel current, the minimum recording area thereof being a 10 nm square.

A microtip of a STM is formed on a free end side of a cantilever, the cantilever being formed from several sub-cantilevers so as to flex independently of each other, further made integral with a semiconductor device. A recording and reproducing apparatus has been proposed having a cantilever with a microtip for detecting a tunnel current, an amplifier for amplifying the tunnel current, a multiplexer for selecting cantilever driving and tunnel current and the like mounted on one board.

A conventional cantilever itself is formed of multilayers for the purpose of driving the scanning. The cantilever construction shown, for example, in FIG. 7, is a five-layer structure of piezoelectric members and electrodes. If different types of thin films are stacked or bonded together, internal stress inevitably occurs in the thin films. This is thought to occur in the interface because of differences in the thermal expansion coefficients and lattice constants thereof. Particularly, in thin films (thickness < 2 μm), internal stress which occurs in the interface is a major problem. For this reason, it is impossible to strictly control stress values, and the cantilever formed by laminating thin films sometimes warp because of internal stress, making it impossible to control the driving of the cantilever with a high degree of accuracy. Moreover, since the cantilever is formed of piezoelectric substances, Young's modulus thereof is low, and therefore the natural frequency and rigidity thereof are not high. A low natural frequency and rigidity causes the scanning speed to be slow, and quite a few problems resulting from mechanical impact may occur.

Also, since the cantilever itself in the electrostatic driving type of U.S. Pat. No. 4,668,865 shown in FIG. 6 is used as an electrode, a two-layer structure of a cantilever and an insulating layer is necessary in order to insulate the microtip. The above case presents a problem in that parasitic capacitance is induced in the microtip because a microtip 68 and an electrode 64 are arranged with an insulating layer 66 in between. Moreover, in this method, the cantilever can be driven only perpendicular (Z-axis) to a Si wafer board 61.

SUMMARY OF THE INVENTION

Accordingly, it is an object of the present invention to provide a displacement element and a cantilever probe wherein internal stress can be easily controlled, has no warp, has high rigidity and characteristic frequency, and is capable of being driven at high speed.

It is another object of the present invention to provide a cantilever probe in which the displacement element is used to reduce the parasitic capacitance which is induced in the microtip, and to provide a large-capacity and high-density information processing apparatus for recording, reproducing and erasing information by using the cantilever probe.

To achieve the above-described objects, according to one aspect of the present invention, there is provided a displacement element comprising a substrate having an electrode and a cantilever on the substrate, said cantilever comprising a semiconductor material and at least two electrostatic driving electrodes, said electrostatic driving electrodes being formed by diffusing an impurity into the semiconductor material.

According to another aspect of the present invention, there is provided a cantilever probe comprising a substrate having an electrode and a cantilever on the substrate, said cantilever having a microtip on a free end portion thereof, and said cantilever comprising a semiconductor material and at least two electrostatic driving electrodes, said electrostatic driving electrodes being formed by diffusing an impurity into the semiconductor material.

According to yet another aspect of the present invention, there is provided an information processing apparatus comprising means for recording, reproducing and erasing information from a recording medium; means for bringing a cantilever probe provided with a microtip adjacent to the recording medium; and means for applying a voltage between the microtip and the recording medium; wherein said cantilever probe comprises a substrate having a plurality of electrodes and a microtip having a probe electrode on a free end portion thereof; said microtip comprising a semiconductor material and at least two electrostatic driving electrodes, said electrostatic driving electrodes being formed by diffusing an impurity into the semiconductor material.

The above and further objects and novel features of the invention will be more fully apparent from the following detailed description when the same is read in connection with the accompanying drawings. It is to be expressly understood, however, that the drawings are for the purpose of illustration only and are not intended as a definition of the limits of the invention.

BRIEF DESCRIPTION OF THE DRAWINGS

FIGS. 2(a) to 2(i) are illustrations of a step of fabricating a cantilever probe in accordance with the present invention;

FIGS. 3(a) to 3(i) are illustrations of the step of fabricating a cantilever probe in accordance with the present invention;

DETAILED DESCRIPTION OF THE PREFERRED EMBODIMENTS

According to the construction of the displacement element of the present invention, a cantilever may be formed into a single layer. Thus, the stress of the cantilever can be controlled very easily, and a warp of the cantilever can be reduced. Materials suitable for a substrate include semiconductors, metals, glass, ceramics and the like. A semiconductor substrate, especially a Si wafer, is preferable to integrally form the substrate and a cantilever formed from a semiconductor, on which a cantilever and electrostatic driving electrode is formed through impurity diffusion. When a semiconductor substrate is used, an electrode may be formed on the substrate through impurity diffusion in the same manner as in a cantilever.

In the present invention, impurities which can be used to form an electrode are not particularly limited. For example, boron (B) or phosphorus (P) may be used. In this case, the electrode has p-type or n-type conducting type.

Next, the present invention will be explained with reference to the accompanying drawings.

Figure 1A:
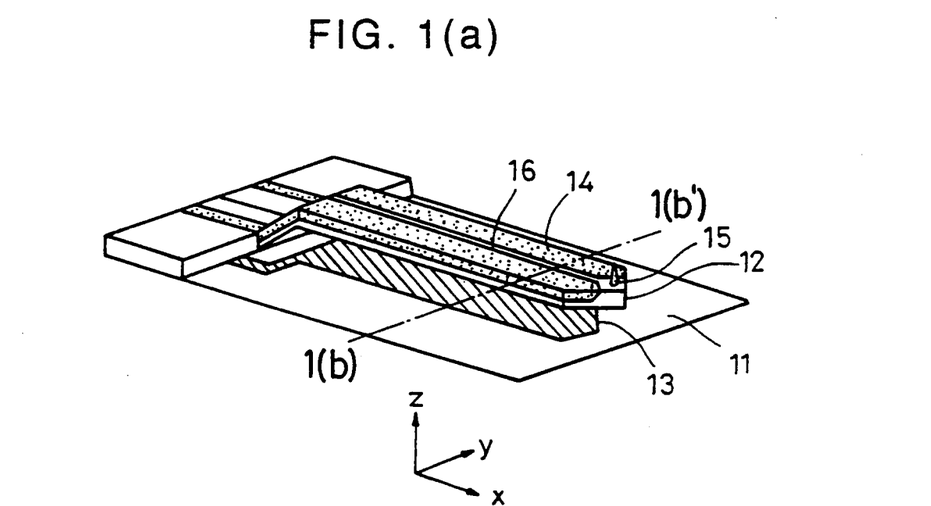
FIGS. 1(a) to 1(d) are illustrations of a cantilever probe in accordance with the present invention.
Figure 1B:
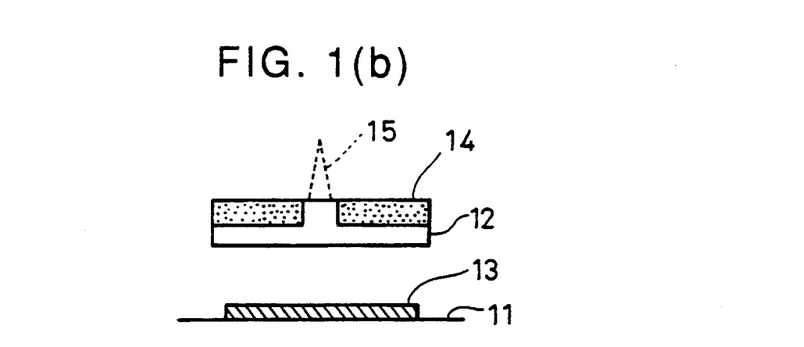

FIG. 1(a) is a perspective view illustrating a cantilever probe having a microtip provided on a displacement element of the present invention. FIG. 1(b) is a sectional view taken along the line 1(b)–1(b) of FIG. 1(a) when no voltage is applied.

Figure 1C:
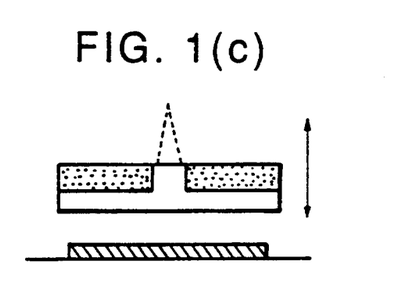
Figure 1D:
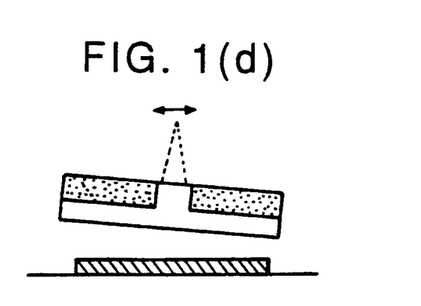

Arranged on a Si substrate 11 of the displacement element are a cantilever 12 formed of a polycrystal Si and an electrostatic driving electrode 13, a predetermined gap being maintained between the cantilever and the electrode. An electrostatic driving electrode 14 in which an impurity is diffused, partially divided into two parts, is formed on the polycrystal Si of the cantilever 12. A microtip 15 for an information input/output STM and a drawing electrode 16 therefor are disposed between the parts of the electrostatic driving electrode 14 on the cantilever 12. Though not shown, ICs for a circuit for operating the cantilever probe and for a circuit for processing signals are mounted on one Si substrate. It is possible to move the leading edge of the microtip 15 on the cantilever 12 upward or downward (Z-axis) by varying a voltage applied to the electrostatic driving electrodes 13 and 14. It is also possible to twist the cantilever 12 by applying different voltages to the electrostatic driving electrode 14 divided into two parts, with the result that the leading edge of the microtip 15 can be moved from side (Y-axis). FIGS. 1(c) and 1(d) illustrates the operation of the cantilever 12 while the displacement element is being driven. FIG. 1(c) is an illustration when z axis driving and FIG. 1(d) is an illustration when y axis driving.

With the above-described construction, a parasitic capacitance which is caused in the microtip while the cantilever is being driven can be reduced. A rigidity sufficiently larger than that of the conventional cantilever can be achieved by using a piezoelectric substance such as ZnO and by using a material having a high Young's modulus, for example, Si, as a cantilever material, as described above.

In the cantilever probe of the present invention, precious metals such as Pt, Au, Rh or Pd, a metal such as W, alloys of these metals, a lamination of these metals, or TiC are used as materials for the microtip. After small pieces of the above materials are bonded, or thin films of the above materials are stacked, the cantilever probe may be processed and produced in a desired shape by etching or electrolytic polishing, if necessary. Conventional well-known technology for thin film fabrication method, for example, a vacuum deposition method, sputtering method, chemical vapor deposition method, photolithography technology or etching technology, which are commonly used in the semiconductor industry, may be used as the method of forming a displacement element and a cantilever probe in accordance with the present invention. However, the fabrication method is not limited to the present invention.

A recording medium for recording information formed of a substrate and a recording layer disposed thereon and having a memory switching phenomenon (electric memory effect) in current and voltage characteristics is preferably used in the present invention. However, the recording medium is not limited to this forming method.

The electric memory effect in the present invention means that at least two different resistance states are shown in correspondence with voltage application. That is, transition occurs freely to any of the states as a result of a voltage or current exceeding a threshold value for varying the conductivity of the recording layer being applied, and each of the obtained resistance states being maintainable as long as a voltage or current not exceeding the threshold value is applied. Recording materials (media) having such an electric memory effect as disclosed in, for example, Japanese Patent Laid-Open Nos. 63-161522 and 63-161523, are preferably used as recording materials.

The present invention will be explained below specifically with reference to the embodiments.

FIRST EMBODIMENT

In this embodiment, the cantilever probe of the present invention shown in FIG. 1 is manufactured by using Si as a substrate through an IC fabrication process.

The fabrication method will be explained below. FIGS. 2(a) to 2(i) are illustrations of a step of fabricating a cantilever probe in accordance with this embodiment. Initially, a $Si_3N_4$ 22 is formed into a thickness of 3,000 Å on the surface of the Si substrate 11 on which a thermally oxidized film 21 5,000 Å thick is formed by means of a LP-CVD apparatus (FIG. 2(a)). Next, an electrostatic driving electrode (W-Si) 13 is formed on the Si substrate 11 by a lift-off method (FIG. 2(b)). After an oxidized Si film 23 which serves as a sacrifice layer is formed into a 5 μm thickness by sputtering (FIG. 2(c)), it is patterned by a photolithographic method and wet etching (FIG. 2(d)). Next, a polycrystal Si (p-Si) film 24 is formed into a thickness of 0.8 μm by the LP-CVD method (FIG. 2(e)). Then, after a resist pattern is formed, ion implantation for forming the cantilever-side electrostatic driving electrode 14 (FIG. 2(f)) is performed. Phosphorus (P) is used for implantation at a concentration of $1 \times 10^{16}$ cons/$cm^2$. After heat treatment is performed, the cantilever 12 is patterned by a photolithographic method and wet etching (FIG. 2(g)). Next, metallic pieces of Pt, Rh, W or the like are bonded onto the cantilever 12, thus forming the microtip 15 (FIG. 2(h)). Finally, a sacrifice film 23 is removed by wet etching (FIG. 2(i)).

Figure 2A:
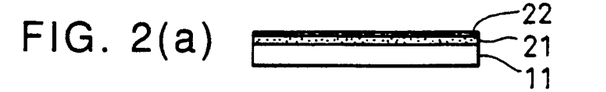
Figure 2B:
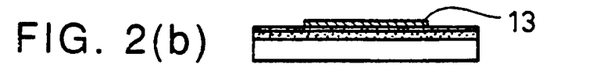
Figure 2C:
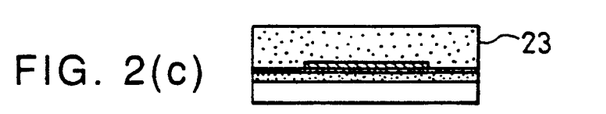
Figure 2D:
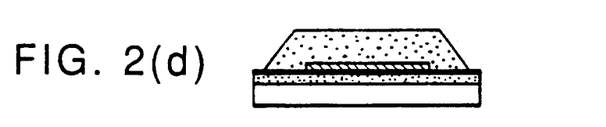
Figure 2E:
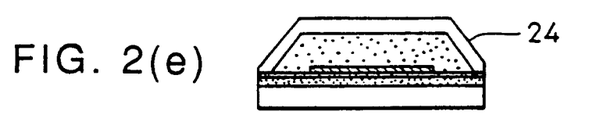
Figure 2F:
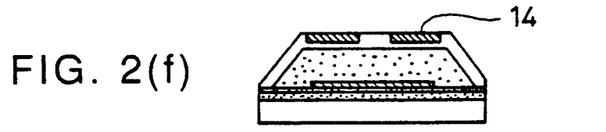
Figure 2G:
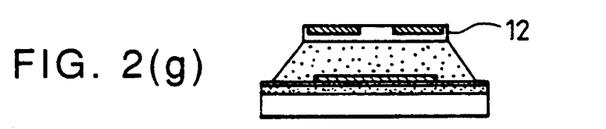
Figure 2H:
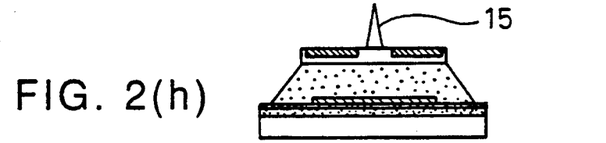
Figure 2I:
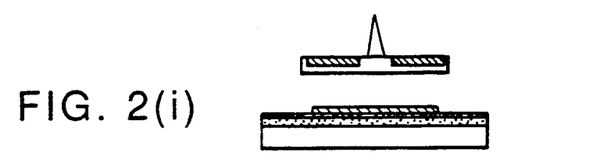

Regarding the cantilever probe manufactured in this way, since the cantilever is formed of a single layer made of only p-Si, the stress of the cantilever probe can be easily controlled by heat treatment. Warp of the cantilever hardly occurs. If the formation of the microtip 15 is omitted in the above-described fabrication process, a displacement element can be manufactured.

The dimensions and ratings of the manufactured cantilever probe are listed below:

Cantilever dimensions: 500×100×0.8 μm
Size of electrostatic driving gap: 5 μm
Y-axis displacement amount: 7 Å/±0.5 V (microtip: 7 μm in length)
Z-axis displacement amount: 1.7 μm/±2 V
Z-axis characteristic frequency: 10 KHz As described above, a cantilever probe having high responsiveness and high rigidity can be formed. When it is modified to change the degree of responsiveness and rigidity, the length and thickness of the cantilever may be varied.

In this embodiment, the above-described displacement element is given a multi-membered form by using Si as a substrate.

Figure 4:
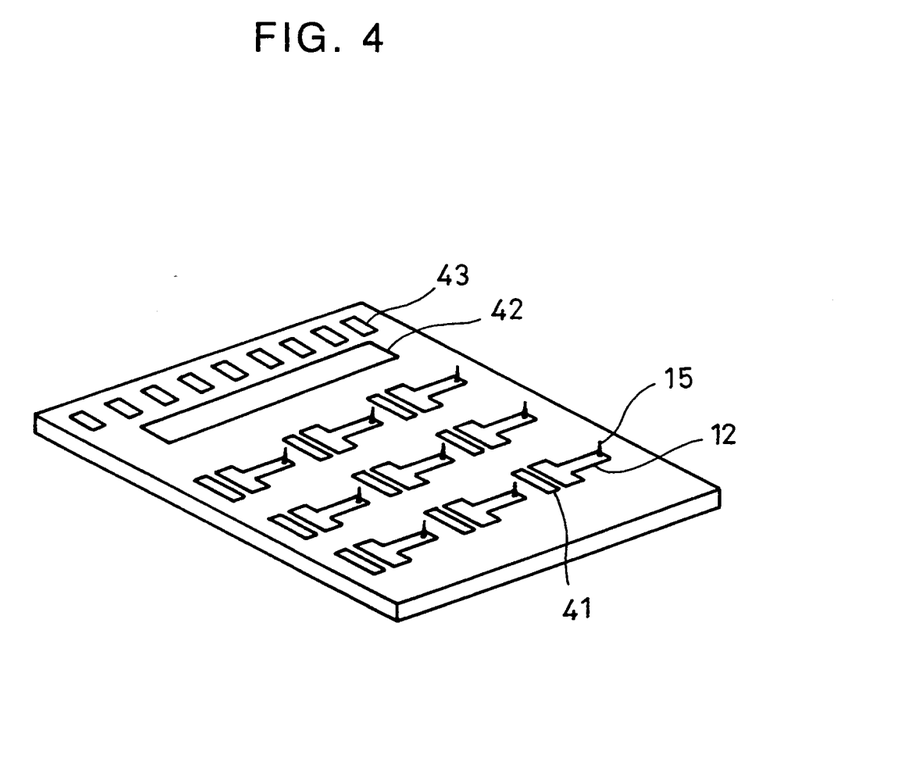
FIG. 4 is an illustration of an integrated cantilever probe in accordance with the present invention.
Figure 5:
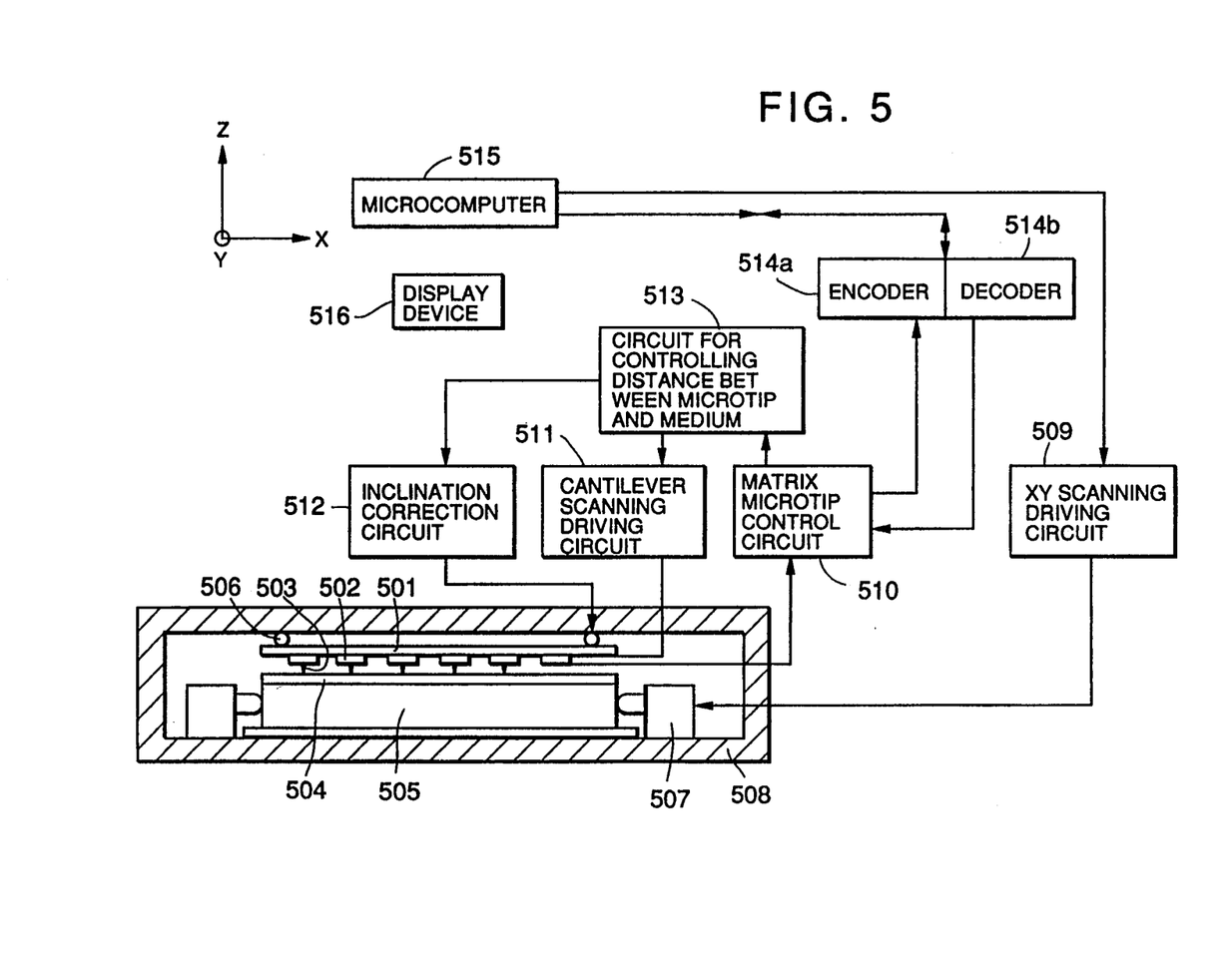
FIG. 5 is a block diagram illustrating the construction of an information processing apparatus of the present invention.

FIG. 4 shows a perspective view of this multi-membered cantilever probe. Not only a plurality of the cantilevers 12 and the microtips 15, but also a tunnel current amplifier 41 and an IC 42 through which various control data of the operations of a plurality of cantilevers and information can be transferred are mounted on the cantilever probe. This IC 42 is extended to an electrode pad 43. FIG. 5 is a block diagram of the construction of an information processing apparatus using the cantilever probe of this embodiment. A cantilever 502 of a cantilever probe 501 of this embodiment, a microtip 503 and an IC 510 for controlling the cantilever and the microtip are mounted inside a structure 508 on an inclination correction mechanism 506. A substrate 505 for the recording medium and a recording layer 504, having an XY scanning mechanism 507 positioned between them, are mounted in such a manner as to face the inclination correction mechanism 506. The XY scanning mechanism 507 is connected to an XY scanning driving circuit 509. The cantilever probe is connected to the microtip 503, a matrix microtip control circuit 510 via a medium-to-medium control circuit 513, a cantilever scanning driving circuit 511 and an inclination correction circuit 512. The matrix microtip control circuit 510 is connected to an encoder 514a and a decoder 514b through which data is input and output. The encoder 514a and the decoder 514b are connected to a microcomputer 515, and information can be confirmed by a display apparatus 516.

Writing data is encoded by the encoder 514a and transferred to the matrix microtip control circuit 510. A cantilever probe 501 is driven to write the data on the recording layer 504. When data is to be read out, an address to be read out is generated by the microcomputer 515, and the matrix microtip control circuit 510 is driven. The matrix microtip control circuit 510 reads out signals from the cantilever probe 501 through each of a plurality of microtips 503, and transfers the signals to the decoder 514b. The decoder 514b performs error detection or error correction on the basis of these signals, and outputs the data. Information on a tunnel current flowing through each microtip 503 is directly read out by the matrix microtip control circuit 510. A variation from a reference position is detected by the circuit 513 for controlling the distance between the microtip and the recording medium. All of the microtips 503 along the Z axis are controlled by the cantilever scanning driving circuit 511. When it is necessary to correct the orientation of the cantilever probe 501, such correction is performed by the inclination correction circuit 512.

In this embodiment, a glass substrate is used as the substrate 505 of the recording medium. A recording layer having an Au electrode vacuum-deposited on the substrate 505 to a thickness of 100 nm is used as the recording layer 504. Initially, the cantilever probe 501 is positioned to face the recording medium. A voltage of 0.5 V is applied to the microtip 501 and the recording layer 504 formed of an Au electrode. Next, a voltage is applied between the electrostatic driving electrodes 13 and 14 of the cantilever probe 501 so that the value of a tunnel current between the microtip 503 and the recording layer 504 becomes approximately 1 nA, thereby displacing the microtip 503 along the Z axis. Thereafter, different voltages are applied to the electrostatic driving electrode 14 divided into two parts on the cantilever 12 of the cantilever probe 501, the microtip 503 is scanned along the Y axis, and recording bits are recorded one after another. Next, to reproduce these recording bits, the voltage between the electrostatic driving electrodes 13 and 14 is controlled so that the tunnel current value becomes constant. The presence or absence of recording bits can be determined by checking the voltage applied between these electrostatic driving electrodes.

Thus, as shown above, recording, reproducing or erasing recording information can be performed stably at high speed with a high degree of reproducibility when the information processing apparatus of this embodiment is used.

SECOND EMBODIMENT

In this embodiment, the cantilever probe shown in FIG. 1 of the present invention is manufactured according to the fabrication process shown in FIG. 3.

Figure 3A:
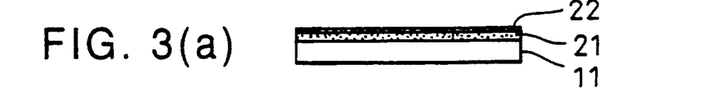
Figure 3B:
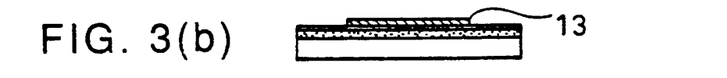
Figure 3C:
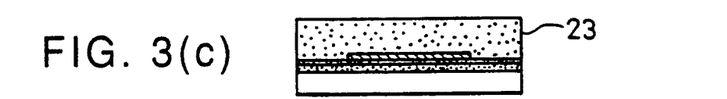
Figure 3D:
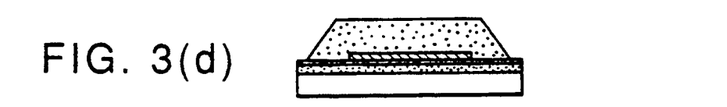
Figure 3E:
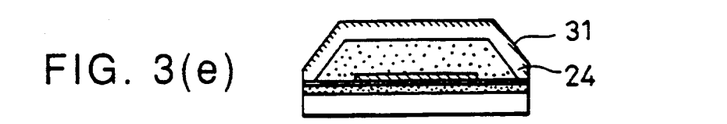
Figure 3F:
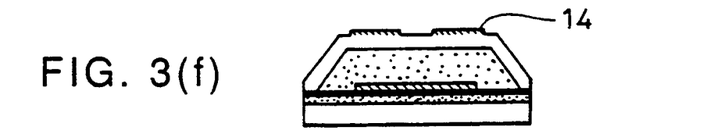
Figure 3G:
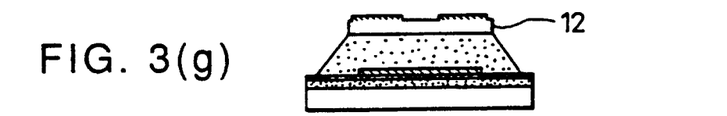
Figure 3H:
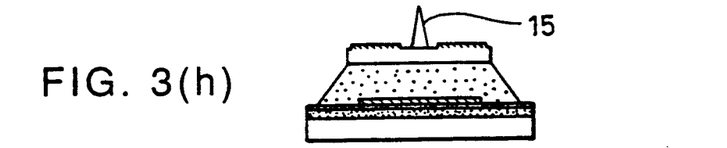
Figure 3I:
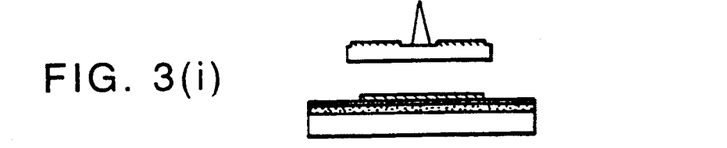

Initially, the $Si_3N_4$ 22 is formed into a thickness of 3,000 Å on the surface of the Si substrate 11 on which the thermally considered film 21, 5,000 Å thick, is formed by a LP-CVD apparatus (FIG. 3(a)). Next, a p-Si layer in which boron is doped by the LP-CVD method is formed on the $Si_3N_4$ 22, and then etched, thus forming the electrostatic driving electrode 13 on the substrate 11 side (FIG. 3(b)). Next, after the oxidized Si film 23 which serves as a sacrifice layer is formed by sputtering into a 5 $\mu$m thickness (FIG. 3(c)), it is patterned by a photolithographic method and wet etching (FIG. 3(d)). Next, the polycrystal Si (p-Si) film 24 is formed into a thickness of 0.8 $\mu$m thick by the LP-CVD method, after which a p-Si film 31 in which boron is doped is formed into a thickness of 0.1 $\mu$m (FIG. 3(e)). The sheet resistance of this p-Si film 31 is 1 $\Omega/\square$. After a resist pattern is formed on the p-Si, it is etched, thus forming the cantilever-side electrostatic driving electrode 14 (FIG. 3(f)). After heat treatment is performed, the cantilever 12 is patterned by a photolithographic method and wet etching (FIG. 3(g)). Next, metallic pieces of Pt, Rh, W or the like are bonded onto the cantilever 12, thus forming the microtip 15 (FIG. 3(h)). Finally, the sacrifice film 23 is removed by wet etching, completing the cantilever probe (FIG. 3(i)).

When recording and reproduction are performed by using this cantilever probe in the same way as in the first embodiment, data can be written and read out at high speed with a high degree of accuracy.

As has been explained above, since a cantilever probe can be formed of a single layer in the displacement element of the present invention, no warp due to internal stress occurs. In addition, an element having high rigidity and high characteristic frequency can be obtained. Therefore, the cantilever probe using this displacement element achieves high reliability and high response speed. Further, since no parasitic capacitance is induced in a microtip from a structural point of view, highly reliable, high-density and large-capacity recording and reproduction can be realized in an information processing apparatus using this microtip.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the claims. The following claims are to be accorded the broadest interpretation, so as to encompass all such modifications and equivalent structures and functions.

What is claimed is:

1. A displacement element, comprising:
   a substrate having an electrode; and
   a cantilever on the substrate, said cantilever comprising a semiconductor material and at least two electrostatic driving electrodes, said electrostatic driving electrodes being formed by diffusing an impurity into the semiconductor material.

2. A displacement element according to claim 1, wherein the cantilever and the electrode of the substrate are positioned to face each other.

3. A displacement element according to claim 1, wherein the semiconductor material is silicon.

4. A displacement element according to claim 1, wherein the electrostatic driving electrodes are formed by diffusing boron or phosphorus into the semiconductor material.

5. A displacement element according to claim 1, wherein the electrostatic driving electrodes are separately disposed along the length of the cantilever.

6. A displacement element according to claim 1, comprising a plurality of cantilevers on one substrate.

7. A cantilever probe, comprising:
   a substrate having an electrode; and
   a cantilever on the substrate, said cantilever having a microtip on a free end portion thereof, said cantilever comprising a semiconductor material and at least two electrostatic driving electrodes, said electrostatic driving electrodes being formed by diffusing an impurity into the semiconductor material.

8. A displacement element according to claim 7, wherein the cantilever and the electrode of the substrate are positioned to face each other.

9. A displacement element according to claim 7, wherein the semiconductor material is silicon.

10. A displacement element according to claim 7, wherein the electrostatic driving electrodes are formed by diffusing boron or phosphorus into the semiconductor material.

11. A displacement element according to claim 7, wherein the electrostatic driving electrodes are separately disposed along the length of the cantilever.

12. A displacement element according to claim 7, comprising a plurality of cantilevers on one substrate.

13. An information processing apparatus comprising means for recording, reproducing and erasing information from a recording medium comprising: means for bringing a cantilever probe provided with a microtip adjacent to the recording medium; means for applying a voltage between the microtip and the recording medium; wherein the cantilever probe comprises: a substrate having an electrode and a cantilever on the substrate, said cantilever having a microtip on a free end portion thereof, said cantilever comprising a semiconductor material and at least two electrostatic driving electrodes, said electrostatic driving electrodes being formed by diffusing an impurity into the semiconductor material.

14. An information processing apparatus according to claim 13, wherein the cantilever and the electrode of the substrate are positioned to face each other.

15. An information processing apparatus according to claim 13, wherein the semiconductor material is silicon.

16. An information processing apparatus according to claim 13, wherein the electrostatic driving electrodes are formed by diffusing boron or phosphorus into the semiconductor material.

17. An information processing apparatus according to claim 13, wherein the electrostatic driving electrodes are separately disposed along the length of the cantilever.

18. An information processing apparatus according to claim 13, comprising: a plurality of cantilevers on one substrate.

* * * * *